United States Patent [19]
Miller

[11] 3,730,176
[45] May 1, 1973

[54] DEVICE FOR PREVENTING CONTAMINATION IN HYDROTHERAPY TREATMENT SYSTEM
[75] Inventor: Robert C. Miller, Elgin, Ill.
[73] Assignee: Borg-Warner Corporation, Chicago, Ill.
[22] Filed: Dec. 28, 1971
[21] Appl. No.: 213,142

[52] U.S. Cl. ............................128/66, 4/185 L, 5/83
[51] Int. Cl. ...............................................A61h 9/00
[58] Field of Search .......................128/66; 4/185 L; 5/83

[56] References Cited
UNITED STATES PATENTS
2,133,587 10/1938 Stark..................................4/185 L
3,455,299 7/1969 Gerow..................................128/66

Primary Examiner—Lawrence W. Trapp
Attorney—William S. McCurry et al.

[57] ABSTRACT

A hoist-controlled litter or plinth, which supports a patient partially immersed in agitated water in a hydrotherapy tank, is covered with a disposable flexible, water-tight sleeve, made of plastic film, in order to completely isolate the litter from any contact with the water. The water-tight barrier established by the sleeve prevents the transmission of bacteria between the litter and the water in the tank and this in turn prevents the various patients using the litter from cross-infecting each other. Apertured conduits or air tubes may be attached to or integrally formed in the flexible plastic sleeve to facilitate the injection of pressurized air into the water to effect the required water agitation. The particular locations of the openings in the air tubes may be customized to the specific needs of each patient, thereby providing agitation only adjacent those localized areas of the patient's body necessitating hydrotherapy treatment.

8 Claims, 4 Drawing Figures

Patented May 1, 1973   3,730,176
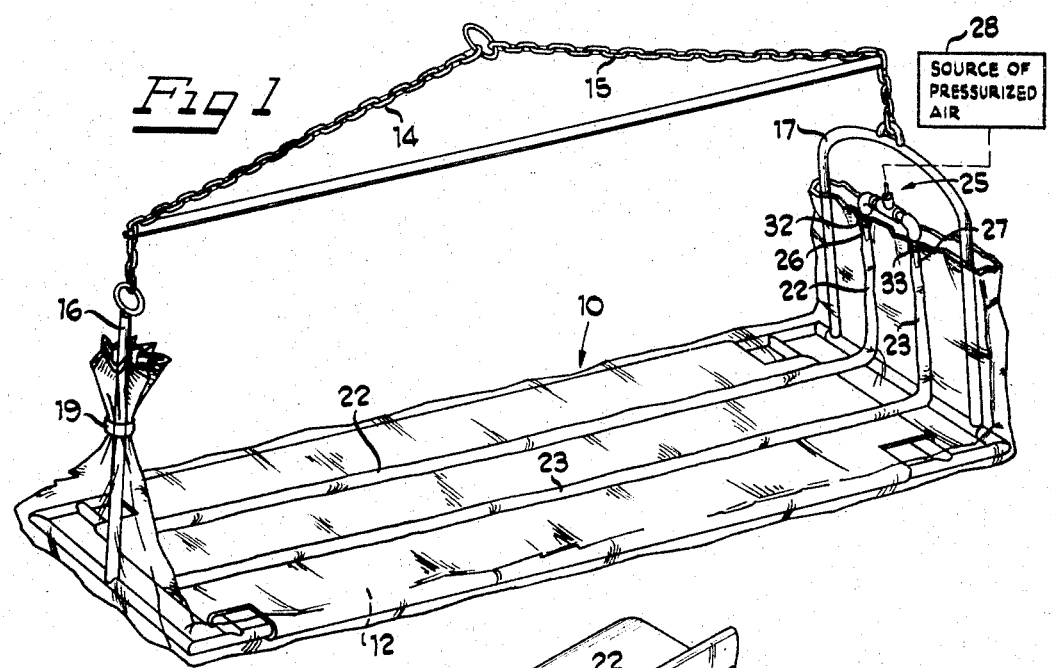
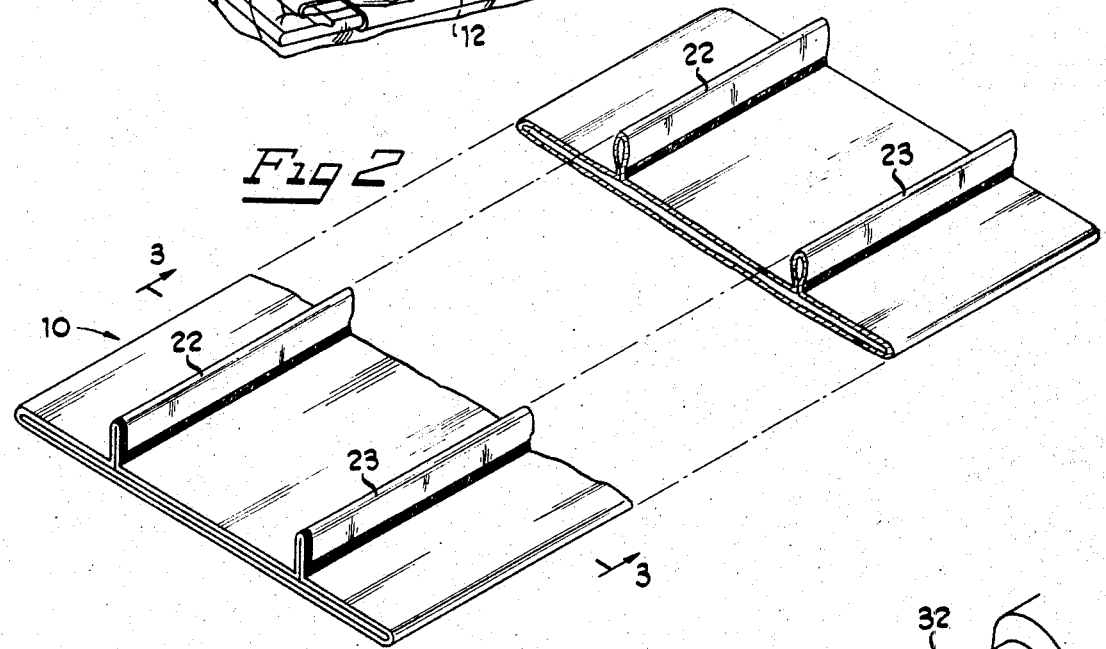
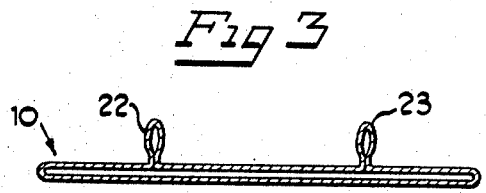
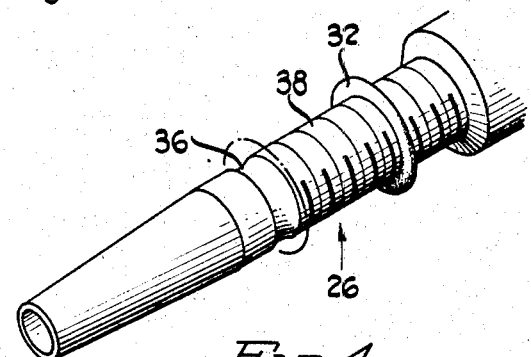

DEVICE FOR PREVENTING CONTAMINATION IN HYDROTHERAPY TREATMENT SYSTEM

BACKGROUND OF THE INVENTION

When a relatively large tank, such as a Hubbard tank, is employed in a hydrotherapy treatment system the patient to be treated is usually transferred to and lowered into the water in that tank on a patient-carrying litter or plinth controlled by a hoist mechanism. All of the elements in contact with the water, and this includes the litter and the submerged parts of the connections to the hoist mechanism, should be sterilized beforehand so that the patient being treated does not become infected by any bacteria on the litter and hoist connection. Of course, steps must also be taken to ensure that bacteria on the internal surfaces of the tank do not cause infections.

Hydrotherapy treatments are customarily given to burn patients and such patients are particularly vunerable to infections. Due to the nature of its construction, however, sterilization of the litter is most difficult and oftentimes a supposedly sterilized litter still bears infection-causing bacteria. Unfortunately, in the past many burn patients have died from infections picked up from a litter or plinth while receiving hydrotherapy treatment.

This problem has now been overcome. With the present invention, it is now impossible for any bacteria to be transferred from a litter to a patient being treated, even though the litter is not sterilized. By the same token, there is also no way for bacteria to be conveyed from that patient to the litter. This is achieved by means of a uniquely constructed contamination prevention device. In addition, with the invention agitation of the water in the hydrotherapy tank may be localized to treat only those areas of the patient's body requiring treatment.

SUMMARY OF THE INVENTION

The contamination prevention device of the invention is to be incorporated in a hydrotherapy treatment system wherein a patient is supported partially immersed in a water-filled hydrotherapy tank on a patient-carrying litter or plinth, the head and foot ends of which are upwardly connected to and held by a hoist mechanism. The device comprises a disposable flexible water-tight sleeve, made of plastic film, which covers or encases the entire litter in order to completely isolate it from any contact with the water in the hydrotherapy tank, thereby preventing the transmission of bacteria between the litter and water to preclude cross-infections between patients. The submerged portions of the hoist connections may also be covered by the same sleeve so that those connections are also isolated from the water. At least one apertured air tube or conduit may be associated with the sleeve to facilitate the injection of pressurized air into the water to cause agitation thereof.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which like reference numbers identify like elements, and in which:

FIG. 1 is a perspective view of a sufficient portion of a hydrothereapy treatment system to illustrate the manner in which the contamination prevention device of the invention may be incorporated in that system;

FIG. 2 is a perspective view of the contamination prevention device by itself;

FIG. 3 is a sectional view of the device taken along section line 3—3 in FIG. 2; and FIG. 4 is an enlarged perspective view of part of one of the elements shown in FIG. 1.

DESCRIPTION OF THE ILLUSTRATED EMBODIMENT

The contamination prevention device is designated by the reference number 10 and constitutes a flexible water-tight sleeve or sheath open at both ends. It is preferably made of transparent plastic film such as polyethylene. A patient-carrying litter or plinth 12 has its head and foot ends upwardly connected and held by a hoist mechanism, not shown. Specifically, upward extension or connection member 16 connects the foot end to hoist chain 14, while extension 17 joins the head end to chain 15. The hoist chains may be disconnected from their associated connecting members 16, 17 so that sleeve 10 may be slipped over, thereby to cover or encase, the entire litter 12 and all or most of both hoist connections 16, 17. Preferably, members 16 and 17 are pivotally coupled to the ends of the litter to allow all three components 12, 16 and 17 to be extended in the same plane to ease the task of inserting the sleeve over these components. For maximum ease in handling, members 16 and 17 should be detachable.

With sleeve 10 positioned as shown in FIG. 1, litter 12 and hoist connections 16, 17 will be completely isolated from any contact with the water in a hydrothereapy tank when the plinth, bearing a patient, is lowered into that water to the extent necessary to submerge the patient's body with the exception of his or her head which will be supported on a head rest. The two open ends of sleeve 10 will, of course, be well above the surface of the water. Hence, there is no way for bacteria to travel from the isolated elements to the water or vice versa.

At the foot end, the sleeve may be gathered together and tied to hoist connection 16 by any suitable means, such as tape 19 as shown in FIG. 1.

At the conclusion of the hydrotherapy treatment, plinth 12 is raised and removed from the tank by the hoist mechanism, after which sleeve 10 is disposed of since it will now be contaminated with bacteria from the patient just treated. The water, of course, is also drained, and the internal surfaces of the tank must be sterilized. One convenient method of blocking bacteria transfer to and from the tank surfaces, without sterilizing those surfaces, is to drape or line the entire inside of the tank with a large sheet of flexible plastic film, as taught in copending application Ser. No. 12,216, filed Feb. 18, 1970 now U.S. Pat. No. 3,648,690, in the name of Robert C. Miller et al. A new sleeve and new water will be used for the next patient. Thus, there will be no way for bacteria to be transferred from one patient to the next.

Agitation of the water may be accomplished with any appropriate equipment, such as a water pump. When a pump is used, however, it must be sterilized after each use. A preferred way to introduce the required water agitation is to inject pressurized air directly into the water. In accordance with a feature of the invention, this is done by attaching conduits or air tubes to the sleeve on the external side closest to the patient. Alternatively, and as shown in the drawing, the conduits may be integrally formed in the sleeve.

Specifically, two air tubes 22 and 23 are built into sleeve 10 by appropriately folding and then heat sealing it along lines parallel to the folds. The left or foot ends of the conduits are closed as shown in FIG. 2, which closings may also be achieved by heat sealing, while the right or head ends are coupled to outlet nozzles 26, 27 of an air supply manifold 25 the inlet of which is coupled to a source 28 of pressurized air, which source may constitute a conventional air compressor. Before the patient is placed on the sleeve-covered litter, a therapist punctures the air tubes to provide openings therein where agitation is desired for the particular patient to be treated. In this way, when the litter and patient are placed in the water-filled hydrotherapy tank and air is delivered from source 28 to the air tubes, pressurized air is injected through the punched holes and into the water to effect agitation thereof to treat only those parts of the patient's body needing treatment. For many patients it is extremely important not to disturb especially sensitive or painful areas.

Conduits 22 and 23 are respectively held onto nozzles 26 and 27 by means of snugly-fitting elastic O-rings 32 and 33. More particularly, nozzles 26 and 27 are spaced apart a distance less than the spacing between the air tubes. The enlarged view of nozzle 26 in FIG. 4 will be helpful in understanding the specific manner in which conduits 22 and 23 are attached to the nozzles. Of course, nozzle 27 is identical to nozzle 26 so only one is shown in FIG. 4. The end of each nozzle is tapered, increasing to a maximum diameter less than that of the air tube to which it is to be coupled, so that the tube may be quickly and easily slipped over the nozzle. An annular groove (see groove 36 in FIG. 4) is formed in each nozzle, following the tapered end section, to accommodate the associated O-ring.

Before each air tube is slipped or inserted over the nozzle, the O-ring is first rolled away from the groove, namely to the right as viewed in FIG. 4. This step is aided by providing a threaded section beyond the groove, as indicated by reference number 38. With the O-ring out of the way, the air tube may be slipped over the nozzle to a point well beyond the groove, after which the O-ring may be rolled back over the tube and into the groove, as shown in dashed construction in FIG. 4. The O-ring exerts a radially inward pressure on the conduit sufficient to establish a mechanical support and an air-tight connection or air seal for normal operating pressures. The spacing of nozzles 26 and 27 is less than that of the air tubes to allow the flexible plastic film to be gathered under each O-ring and around the nozzles.

By suitable shaping and sizing of the O-ring grooves and by adjusting the size of the O-rings, the radially inward pressure at each groove may be set so that the air tubes will be blown off of their nozzles at a predetermined blow-off pressure. The connections at nozzles 26 and 27 thus effectively provide pressure relief valves to protect conduits 22 and 23 against damage otherwise caused by excessive pressure. In particular, splitting of the air tubes is prevented in the event air at a relatively high pressure is supplied to the tubes before holes have been punched therein. In one application of the invention, a pressure head of less than one PSI was needed at each air tube to provide adequate air flow and water agitation. Under those circumstances, the attachment of the tubes to the air supply manifold were made to blow off at a pressure around 3 PSI, which is well below the burst strength of the tubes.

The invention provides, therefore, a unique contamination prevention device for insuring that absolutely no bacteria will be transferred to a patient, receiving hydrotherapy treatment, from the plinth or litter on which the patient is supported. Moreover, pressurized air may be introduced into the water of the hydrotherapy tank to provide water agitation or turbulence between the patient and litter and at a point adjacent to that area of the patient's body where treatment is desired.

Certain features described in the present application are disclosed and claimed in copending application Ser. No. 213,145, filed concurrently herewith in the names of Robert C. Miller and Carl K. Miller, and assigned to the present assignee.

While a particular embodiment of the invention has been shown and described, modifications may be made, and it is intended in the appended claims to cover all such modifications as may fall within the true spirit and scope of the invention.

I claim:

1. In a hydrotherapy treatment system wherein a patient is supported partially immersed in a water-filled hydrotherapy tank on a patient-carrying litter, the head and foot ends of which are upwardly connected to and held by a hoist mechanism, a contamination prevention device comprising:

a disposable flexible water-tight sleeve, made of plastic film, covering the entire litter in order to completely isolate it from any contact with the water in the hydrotherapy tank, thereby preventing the transmission of bacteria between the litter and water to preclude cross-infections between patients.

2. A contamination prevention device according to claim 1 in which said sleeve also covers at least the submerged parts of the connections to the hoist mechanism so that the hoist connections are also isolated from any contact with the water.

3. A contamination prevention device according to claim 1 in which at least one apertured conduit is associated with said sleeve to facilitate the injection of pressurized air into the water to effect agitation thereof.

4. A contamination prevention device according to claim 3 in which said conduit lies on the external side of said sleeve closest to the patient to inject pressurized air into the water immediately beneath the patient.

5. A contamination prevention device according to claim 3 in which said conduit has a plurality of apertures, the locations of which are selected to provide water agitation only where needed by the patient.

6. A contamination prevention device according to claim 3 in which said conduit extends along the entire length of said sleeve.

7. A contamination prevention device according to claim 3 in which said conduit is integrally formed in said sleeve.

8. A contamination prevention device according to claim 7 in which said conduit is formed by folding said sleeve and then heat sealing said sleeve along a line parallel to the fold.

* * * * *